Aug. 29, 1939. I. STEIN Re. 21,192
CLIPPING DEVICE
Original Filed May 25, 1935
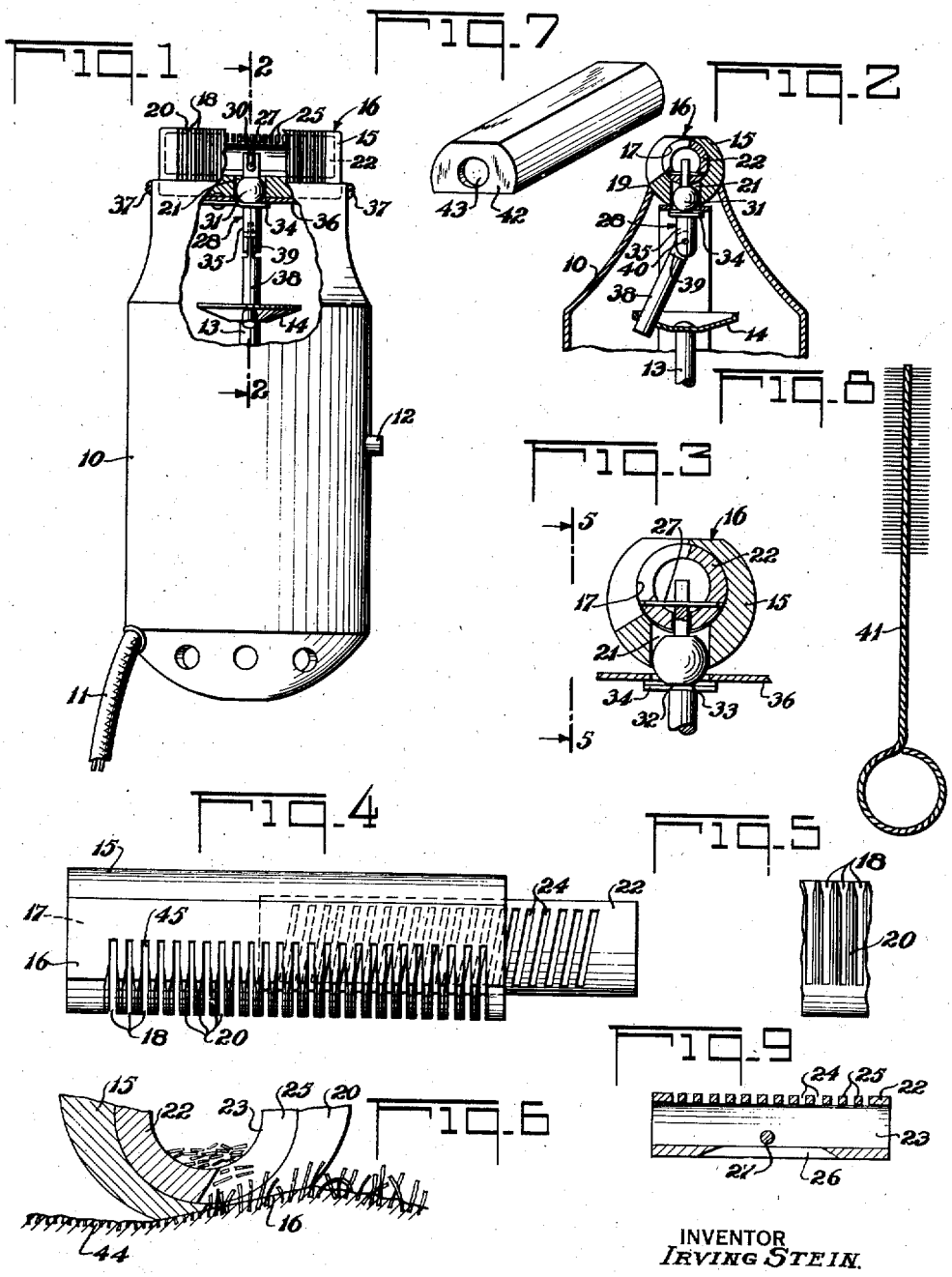
INVENTOR
IRVING STEIN.
BY Van Dewater & Grier
ATTORNEYS Reissued Aug. 29, 1939

Re. 21,192

UNITED STATES PATENT OFFICE 21,192

CLIPPING DEVICE

Irving Stein, Monticello, N. Y.

Original No. 2,049,574, dated August 4, 1936, Serial No. 23,343, May 25, 1935. Application for reissue February 4, 1938, Serial No. 188,749

9 Claims. (Cl. 30—43)

This invention relates to improvements in hair clipping devices and has for a principal object the provision of a hair clipper capable of cutting hair, regardless of the original length of the hair, to a length equivalent to a close shave.

Another object of the invention is the provison of a clipping device having an outer cylindrical member having a flat working face and having a cylindrical bore out of center therein, and closely adjacent to said working face, the relation being in accordance with the resultant length of hair, and the provision of a reciprocable member within said bore, both of said members being provided with slots forming cutting edges.

Still another object of the invention is the provision, in a device of the character described, of a series of slots in the outer member terminating along a line in the flat working face, at substantially the thinnest portion of the outer cylindrical member, and forming the material between the slots to function as a comb for guiding hair into said slots, and having said line serve as the last point of cutting contact with the hair as the device is moved along the surface of the skin.

A further object of the invention is the provision, in a clipping device, of a member engaging and reciprocating the inner member relative to the outer member and at the same time holding the inner member into resilient engagement with the outer member in the immediate cutting area of the device.

Still a further object of the invention is the provision, in a clipping device of the character described, of slots in the inner member angular relative to the slots in the outer member whereby the thinnest portion of the wall of the outer member is adequately supported for all portions of the stroke of the inner member.

Another object of the invention is the provision, in a clipping device, of a member for reciprocating the inner member of the device supported, at least, partly within the outer member of the device, and arranged to reciprocate the inner member within the outer member and at the same time to prevent the inner member from oscillating radially therein.

A further object of the invention is the provision, in a clipper of the character described, of an inner member having a longitudinal hole passing therethrough and communicating with slots formed therein adapted to receive the cut hair, said hole also allowing air to circulate freely therethrough to prevent the device from becoming heated.

Still another object of the invention is the provision, in a clipping device of the character described, of a detachable guard which may be placed on the device when not in use in order to cover and protect the flat working face, the slotted portion of the outer member and both ends thereof, thereby entirely enclosing the working parts of the device.

Still a further object of the invention is the provision, in a clipping device, of a brush, which may be passed through the center hole of the reciprocating member, for cleaning the device without the necessity of taking the same apart.

Other objects will be obvious to those skilled in the art.

Referring to the drawing:

Figure 1 is an elevation showing one modification of the new and improved clipping device mounted upon and in driving relation to an electric motor, the figure being partly broken away to show the linkage between the motor and the device;

Figure 2 is a fragmentary sectional view of Figure 1 taken along the line 2—2;

Figure 3 is an enlarged sectional view of the clipping device per se and a portion of the linkage showing one method of resiliently retaining the inner member into engagement with the outer member within the acting cutting areas;

Figure 4 is an enlarged view of the inner and outer members with the inner member projecting through one end of the outer member showing the arrangement of the slots;

Figure 5 is a fragmentary view, taken along the line 5—5 of Figure 3, showing the formation of the material between the slots into comb like form;

Figure 6 is an enlarged view of a portion of the device in contact with the skin showing the cutting action of the device;

Figure 7 is an isometric view of a cover device for protecting the cutting surfaces when the device is not in use;

Figure 8 is an elevation of a brush suitable for cleaning the device after use; and Figure 9 is a sectional elevation of the inner member of the device showing the driving pin and a portion cut away for clearing the driving member.

Although the device may be driven by a vibrator, spring power or water motor, a preferred embodiment is shown in Figure 1 in connection with an electric motor 10 which is provided with an attachment cord 11, by means of which it may be attached to any suitable source of current, and is also provided with a switch 12 for controlling the current supplied to the motor.

The motor shaft 13 is provided with a cup shaped disc 14 having a hole, relative to the shaft 13, eccentric therein. The method of driving the device by means of the disc 14 will presently be described.

The cutting device consists of an outer cylindrical shear member 15 having a flat portion 16 forming an outer flat face constituting the extremity thereof, said face approaching tangency with the passage or hollow therein. This flat portion constitutes the working face of the device and is at substantially a right angle to the longitudinal axis of the complete device, which therefore need not be held at an angle to the face of the user when shaving. The member 15 has a longitudinal hole 17 formed therein eccentric to the outer diameter of the member and closely adjacent to the flat portion 16. The distance between the hole 17 and the flat portion 16 determines the shortness of the cut. The outer sides of the member 15 where they fall away from the flat surface 16 are substantially parallel and symmetrical so that the device presents a symmetrical appearance without flat or unequal sides. The casing of the motor 10 joins the sides of the member 15 at the point 19 below the horizontal axis of said member.

A plurality of slots 18 are formed in the member 15 extending from a point, indicated on Figure 2 by the numeral 19 where the casing of the motor 10 members up with or abuts the member 15, and ending along a mid-line of the flat portion, which incidentally, is in the thinnest portion of the outer member 15.

The portions 20 between the slots 18 will be termed "webs" or cutting bars.

The outer faces of these webs or cutting bars are tapered to form combs and the inner faces of these webs cooperate with the inner member to form shears, as will presently be described.

Diametrically opposite the face 16, the outer cylindrical member 15 is provided with a radial hole 21. This hole is located centrally with respect to the length of the outer member 15.

An inner cylindrical member 22 forms a free working fit in the eccentric hole 17 in the outer member 15. The inner member 22 is provided with a longitudinal hole 23 which is preferably concentrically located therein. The member 22 is provided with a plurality of diagonal slots 24 and the portions 25 between the slots will be termed "shearing blades", and are continuous, i. e., have no points or extremities.

The inner member 22 has a longitudinal slot 26 formed therein and a driving pin 27 is located in the member 22 adjacent to the slot 26 and at right angles thereto. The pin 27 is utilized in connection with mechanism for reciprocating the inner member 22 within the outer member 15.

By referring to Figures 2 and 3, it will be noted that the wall of the outer member is very thin along the mid-line of the flat portion 16 and, due to the eccentricity of the hole 17, is thickest in the portion opposite the flat portion 16. Due to the fact that the shearing blades 25 are diagonal relative to the webs 20 in the outer member when the two members are assembled, these diagonal shearing blades serve not only as shears but as supports for supporting the wall of the member 15 at its thinnest point.

A driving member, generally designated by the numeral 28 is provided with a rectangular portion 29 having a slot 30 formed therein. The slot 30 forms a working fit with the driving pin 27 and the thickness of the rectangular portion 29 is such that it forms a working fit in the longitudinal slot 26.

Immediately below the rectangular portion 29, as shown in Figures 1, 2 and 3, the driving member 28 is made in the form of a ball 31 which forms a working fit with the radial hole 21 in the outer cylindrical member 15.

Immediately below the ball 31 the driving member 28 has formed therein slots 32 and 33. A spring 34 has a portion thereof in the form of a yoke which engages the driving member 28 through the medium of the slots 32 and 33 and imposes a spring load upward, as viewed in Figures 1, 2 and 3, upon the driving member. This spring load is transmitted to the inner member 22 via the slot 30 in the rectangular portion 29 and via the driving pin 27 which it engages.

Due to the fact that the inner cylindrical member forms a free fit in the eccentric hole 17 the spring load causes the outer surface of the shearing blades to be retained in intimate contact with the inner surface of the webs 20 in the immediate active cutting area, thereby making the friction substantially less than in devices of the prior art in which the inner member 22 is made of thin spring steel which is contracted and inserted into the outer member so that it imposes tension all the way around the circle.

A transverse member 36 in the casing of the motor 10 serves as a support for the spring 34 and the outer cylindrical member 15 is secured to the casing by means of screws 37. The lower portion 35 of the driving member 28 is slotted to form a yoke. This slot is parallel to the slot 30 in the driving pin 27.

A link member 38 has one end forming a tongue 39 which forms a working fit in the yoke in the lower portion 35 and is secured in this relation by a pivot pin 40.

The lower end of the link member 39 extends through and forms a working fit with a hole formed in the cup shaped disc 14.

As the disc rotates due to the movement of the motor the link member 38 drives the driving member 28 and in turn moves the inner cylindrical member 22 through the medium of the tongue 39 and pivot pin 40 and as each end of the stroke of the inner member 22 is approached the swivel action of the tongue 39 and the pin 40 allows the member 22 to stop moving in one direction and to start moving in the reverse direction.

The spring load imposed via the inner member upon the active shearing surfaces not only serves to retain these members in intimate contact but also serves to make the shearing surfaces "self-sharpening". The hole 23, extending through the inner member 22, not only serves to catch the cut hairs but also has a ventilator through which air may freely pass and thereby keeps the temperature of the device low.

A brush 41 may be passed through the hole 23 for removing the cut hairs and cleaning the device without the necessity of disassembling the same.

When not in use the device may have applied thereto a guard 42 which covers the slots and webs, the flat active area 16 and the depressions, one of which is indicated by the numeral 43, engaging and closing the ends of the eccentric hole 17, thereby protecting the mechanism from dust and foreign matter.

In Figure 6, a portion of the skin 44, being shaved or clipped, is shown. The flat portion 16 "irons out" the skin and the outer surfaces of the webs 20, due to their comb-like shape, guide the hairs into the slots 18 where they are met by the shearing blades 25. The cut hairs are shown in the interior hole 23 of the inner member.

The device is moved along the skin against the "lie" of the hair. Although most of the hairs lie slanting in one direction there are other hairs among those which may grow in any direction, in fact, some of them may even turn back and grow into the skin to form an ingrowing hair.

When the device is moved along against the lie of the hair the metal at the end of the slots along the mid-line of the flat portion 16, engages any hairs which may be lying too close to the skin for the device to cut and raises them into engagement with the shearing blades 25. This feature, which might be termed a "reference or index line", is not present in devices of the prior art and therein the inefficiencies of those devices are due to the absence of this feature. This reference line also prevents the hair from jumping out of the slots and obviates the necessity for going over the surface a large number of times to obtain a close, uniform cut.

This advantage will be more apparent by reference to Figure 4 which shows that the webs or cutter bars 20 terminate along a mid or index line and the inner edges of the slot ends 45 at this line cooperate with shearing blades 25 of the inner cutter or cylindrical member 22 to cut hair at the median line and against the bottom of each slot at the point 45 as well as against the transverse edges of any of the slots 18, and by reason of the presence of the solid material forming the median line, any hair encountering the bottom 45 of any slot 18 is raised up to extend through the slot 18 and into engagement with the shearing blades 25 and sheared off by the operation of the device, which is not the case if the slots 18 extend all the way across the flat portion 16. Where slots are continuous, a hair can pass along a slot across the flat portion 16 from one side of the shear member 15 to the other side thereof without being cut.

It will be observed that the teeth 25 of the cutter 22 are continuous and can therefore cut along their inner edges without flexing and have no points or extremities to break. The cooperating surfaces of the bars 20 and the blades 25 are portions of cylinders of substantially the same radius, the blades 25 underlying not only the cutting bars 20, but the solid portion of the face 16 adjacent the index line formed by the ends 45 of the slots 18 so that these shearing blades 25 not only cut by reason of the longitudinal motion of the cutter 22 but also cut against hair stopped at 45.

Although a simple embodiment of the invention is herein shown and described, it is obvious that other forms of the invention may be constructed without departing from the spirit of the invention as defined in the following claims.

What is claimed is:

1. A clipping device comprising a body member having a longitudinal bore, an outer flat surface parallel to said bore and a plurality of transverse slots communicating with said bore and terminating in said flat surface, said bore being eccentric to the outer surface of said body member and closely adjacent to said flat surface whereby the thick portion of said body member forms an adequate support for the webs between said slots forming shearing blades, and a cylindrical shearing member within said bore having a plurality of diagonally transverse slots therein, the webs between said last slots forming shearing blades adapted to cooperate with said first blades, and means to longitudinally reciprocate said shearing member.

2. A device according to claim 1 in which the means to reciprocate the shearing member longitudinally within the body includes a driving member movably supported in said body and resiliently holding the blades of the shearing member in working engagement with the blades of the body within an active area adjacent to said flat surface thereof.

3. A device according to claim 1 in which the webs between the slots in the body have their inner surfaces forming shearing blades, in which the outer surfaces are shaped to form combs for guiding hair into said slots, and in which the slots terminate along the mid-line of said flat surface in the thinnest portion of the wall of said outer member thereby eliminating the necessity for spacing the shearing blades very close together.

4. In a clipping device, a body member having a portion of its outer surface formed flat and having a plurality of transverse slots formed therein terminating in the flat surface and forming therebetween webs comprising blades, an inner shearing member having a plurality of slots formed therein forming shearing blades adapted to cooperate with said first blades, means forming a hole in the wall of said body member opposite said flat surface, means forming a longitudinal slot in said shearing member, a driving pin positioned in said last member adjacent to said longitudinal slot, a linking member pivoted in said hole and having a yoke formed in one end thereof engaging said driving pin, and driving means engaging said linking member to oscillate said shearing member within said body member.

5. A device according to claim 4 in which the portion of the linking member pivoted in said hole is made in the form of a ball forming a ball and socket joint therewith, and having notches formed therein adjacent to said ball, and in which spring means is provided engaging said notches for resiliently holding said shearing member against the inner surface of the body member within an area immediately adjacent to the flat portion.

6. A clipping device according to claim 4 in which the linking member forms a working fit in the longitudinal slot in said shearing member and prevents any radial movement of the latter when the device is operated.

7. In a clipping device, a cylindrical body member having a series of shearing blades formed therein, an inner shearing member adapted to reciprocate within said body member and provided with a series of shearing blades cooperating with said first shearing blades, an electric motor, a driving link between said motor and said shearing member, means forming a ball and socket pivot between said driving link and said body member, and spring means acting via at least a portion of said driving link for maintaining the shearing member in operative engagement with the shearing blades in said body member.

8. In a clipping machine in combination, an electric motor, a casing for said motor having a rectangular opening formed therein, a frame within said casing and having a portion thereof adjacent to said opening, a clipper body member having a longitudinal hole formed therein, including a plurality of shear blades forming a closure for said opening and partially embraced by said casing, means securing said body member to said casing, a shearing member arranged to reciprocate in said hole, said shearing member including a plurality of shear blades, a driving link between said motor and said shearing member pivotally supported in said body member and passing through said frame, and spring means secured to said frame in engagement with said driving link for retaining the blades of said shearing member in engagement with the shear blades of said body member.

9. A machine according to claim 8 in which the clipper body member has a flat face formed thereon and in which slots between said shear blades terminate along a mid line of said flat face where the wall of said member is relatively thin, whereby the said face may progressively flatten the skin ahead of the shearing area and the ends of the slots may guide hair into the blades and eliminate the necessity for moving the machine over the surface of the skin a plurality of times.

IRVING STEIN.